United States Patent
Yu

(10) Patent No.: US 6,224,173 B1
(45) Date of Patent: May 1, 2001

(54) STORAGE ASSEMBLY HAVING A PLURALITY OF HOLDING FRAMES FOR HOLDING RECORDING MEDIA

(76) Inventor: Jackson Yu, 2F, No. 19, Fu-Hsing-I Rd., Pei-Tou Dist., Taipei City (TW)

( * ) Notice: Subject to any disclaimer, the term of this patent is extended or adjusted under 35 U.S.C. 154(b) by 0 days.

(21) Appl. No.: 09/560,585

(22) Filed: Apr. 28, 2000

(51) Int. Cl.[7] ................................................ A47B 81/06
(52) U.S. Cl. ................ 312/9.48; 312/107; 206/308.1; 206/387.15
(58) Field of Search ........................ 312/9.48, 9.47, 312/9.1, 9.9, 9.51, 9.55, 9.56, 9.21, 9.64, 107, 108, 111, 257.1, 223.2, 351; 206/387.1, 387.15, 307, 307.1, 308.1, 308.3; 211/40, 41.12

(56) References Cited

U.S. PATENT DOCUMENTS

| | | | |
|---|---|---|---|
| 1,893,801 | * | 1/1933 | Huffman ......................... 312/107 X |
| 3,841,725 | * | 10/1974 | Dorner ............................... 312/107 |
| 5,320,244 | * | 6/1994 | Yu ................................... 312/9.21 X |
| 5,716,117 | * | 2/1998 | Yu ................................... 312/9.48 X |

* cited by examiner

*Primary Examiner*—James O. Hansen
(74) *Attorney, Agent, or Firm*—Harness, Dickey & Pierce, P.L.C.

(57) ABSTRACT

A storage assembly includes an outer casing having an open front end, a closed rear end, and a rectangular engagement flange that extends frontwardly from the front end. The engagement flange has an upper flange portion, a lower flange portion, and a pair of left and right flange portions interposed between the upper and lower flange portions. Each of two identical holding frames has a rectangular frame body with front and rear ends and of a dimension smaller than that of the outer casing, and a flange engaging member fixed on the frame body at the front end and extending toward the rear end to define a flange engaging groove between the frame body and the flange engaging member. Each flange engaging member has an upper engaging plate section, a lower engaging plate section, left and right engaging plate sections interposed between the upper and lower plate sections, and four rearwardly opening slots at intersections of the upper, lower and left and right engaging plate sections. The holding frames are inserted into the outer casing via the front open end such that the upper and lower flange portions and the left and right flange portions of the engagement flange in the outer casing are press-fitted into the flange engaging grooves of the holding frames via the rearwardly opening slots.

3 Claims, 7 Drawing Sheets

STORAGE ASSEMBLY HAVING A PLURALITY OF HOLDING FRAMES FOR HOLDING RECORDING MEDIA

BACKGROUND OF THE INVENTION

1. Field of the Invention

This invention relates to a storage assembly, more particularly to a storage assembly for recording media, such as laser disks, audio recording tapes, and video recording cartridges.

2. Description of the Related Art

A storage assembly for recording media is known in the art, and includes a casing of predetermined size and dimension such that consumers can select the size of the storage assembly according to their needs. The recording media, such as floppy disks, recording tapes and video cartridges, are of different dimensions and sizes. Some of the storage assemblies presently available are made of wood. Other storage assemblies are made of a plastic material, and are manufactured by extrusion or molding processes. As such, a great number of molds or dies is required for mass production of the storage assemblies, and a high manufacturing cost is subsequently incurred.

A major concern of the industry is to find a way to reduce the manufacturing cost, while enabling the consumer to spend the smallest amount of expense for purchasing a storage assembly that is capable of accommodating different types of recording media.

SUMMARY OF THE INVENTION

The object of this invention is to provide a storage assembly that includes a plurality of holding frames of a particular structure which can be manufactured by a single mold unit so as to reduce the manufacturing cost and within which different types of recording media can be kept.

Accordingly, a storage assembly for recording media of the present invention includes a rectangular outer casing, a plurality of fastening devices, and at least two holding frames. The outer casing has an open front end, a closed rear end, and a rectangular engagement flange that extends frontwardly from the front end. The engagement flange has an upper flange portion, a lower flange portion, and a pair of left and right flange portions interposed between the upper and lower flange portions. Each of the holding frames has a rectangular frame body with front and rear ends and of a dimension smaller than that of the outer casing, and a flange engaging member fixed on the frame body at the front end and extending toward the rear end thereof to define a flange engaging groove between the frame body and the flange engaging member. The flange engaging member of each of the holding frames is rectangular, and has an upper engaging plate section, a lower engaging plate section, left and right engaging plate sections interposed between the upper and lower plate sections, and four rearwardly opening slots at intersections of the upper, lower and left and right engaging plate sections. The holding frames are inserted into the outer casing via the front open end such that the upper, and lower flange portions and the left and right flange portions of the engagement flange in the outer casing are press-fitted into the flange engaging grooves of the holding frames via the rearwardly opening slots. Each adjacent pair of the holding frames are interconnected fixedly by one of the fastening devices for preventing movement of the holding frames within the outer casing in upward, downward, and left and right directions.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
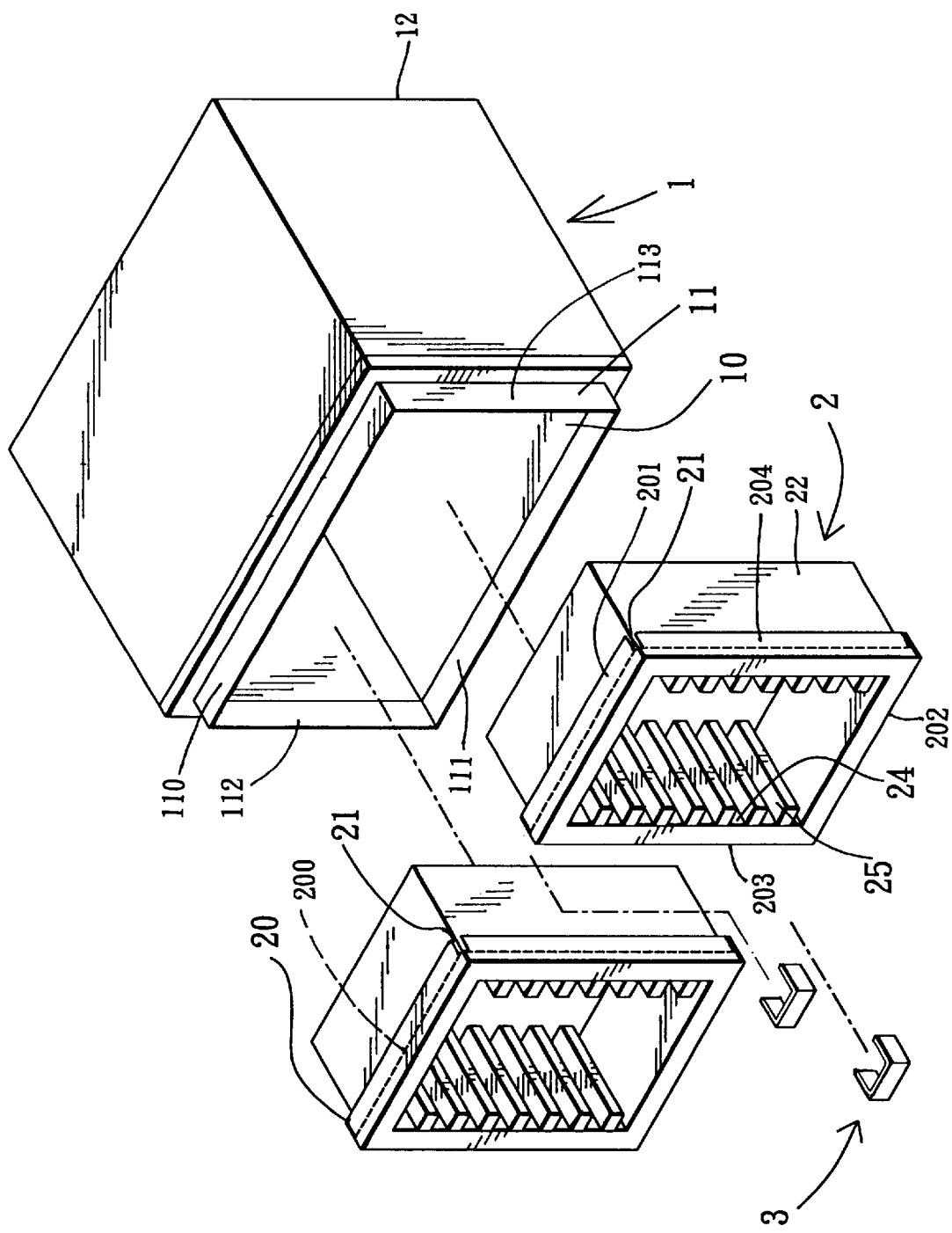
FIG. 1 is an exploded perspective view of the first preferred embodiment of a storage assembly for recording media according to the present invention.
Figure 1A:
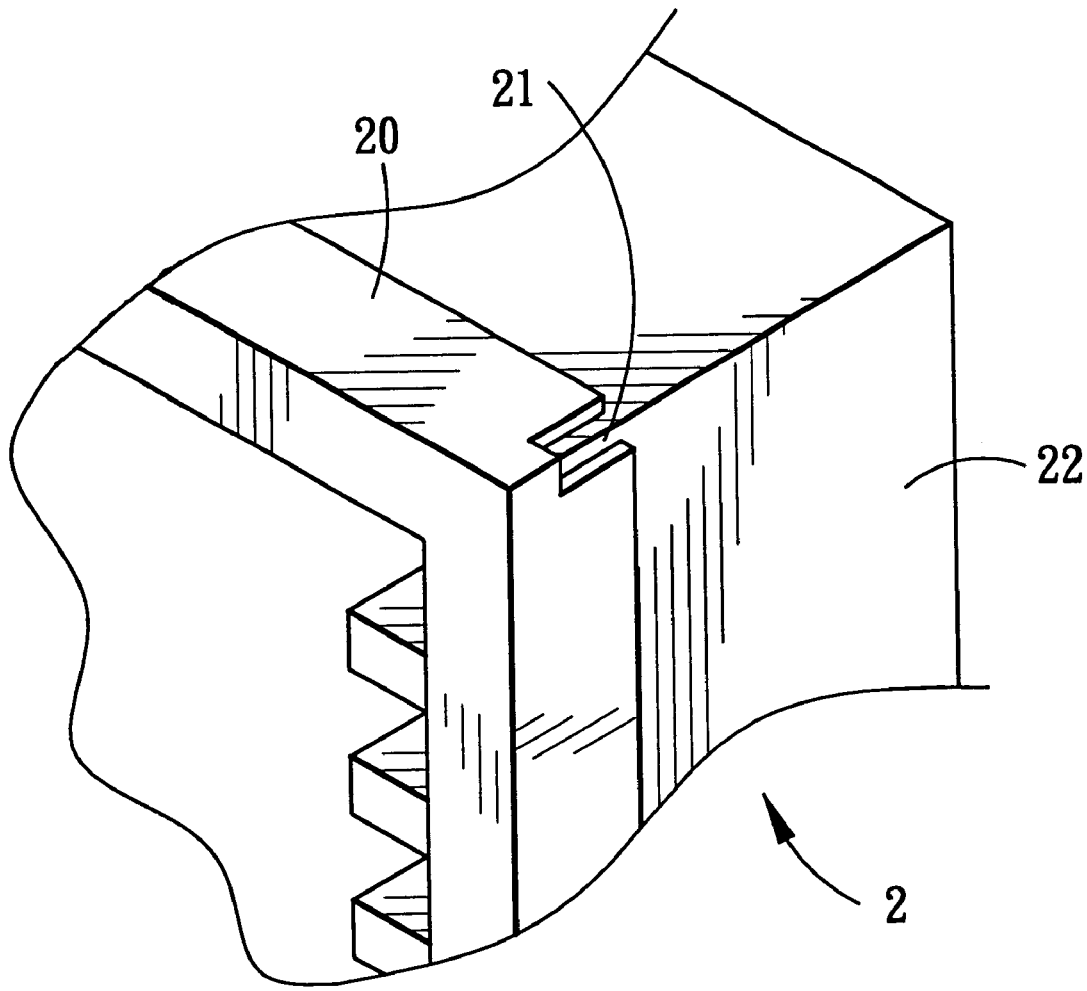
FIG. 1A is a fragmentary perspective view of a holding frame of the first preferred embodiment.

Before the invention is described in greater detail, it should be noted that the same reference numerals will be used to denote the same elements throughout the entire specification.

Figure 2:
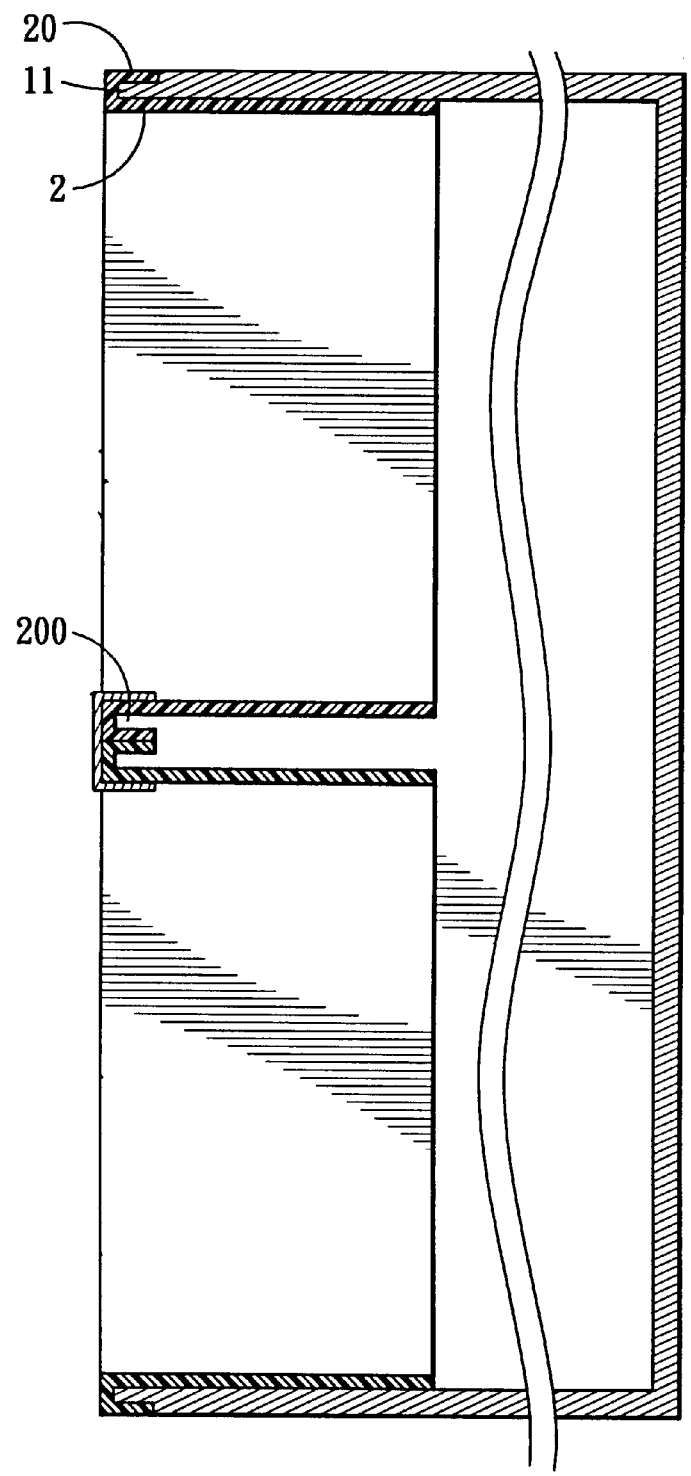
FIG. 2 is a sectional view of the first preferred embodiment, illustrating how two holding frames are fastened in order to prevent relative movement therebetween.

Referring to FIGS. 1, and 2, the first preferred embodiment of a storage assembly for recording media of the present invention is shown to include a rectangular outer casing 1, a plurality of fastening devices, and a plurality of identical hollow holding frames 2.

As illustrated, the outer casing 1, generally made of wood, has an open front end 10, a closed rear end 12, and a rectangular engagement flange 11 which extends frontwardly from the front end 10. Preferably, the engagement flange 11 has an upper flange portion 110, a lower flange portion 111, and a pair of left and right flange portions 112,113 interposed between the upper and lower flange portions 110,111.

Each of the holding frames 2, generally made of plastic, has a dimension smaller than that of the outer casing 1, a rectangular frame body 22 with front and rear ends, and a flange engaging member 20 fixed on the frame body 22 at the front end thereof such that the engaging member 20 extends toward the rear end to define a flange engaging groove 200 between the frame body 22 and the flange engaging member 20. The flange engaging member 20 of each of the holding frames 2 is rectangular, and has an upper engaging plate section 201, a lower engaging plate section 202, left and right engaging plate sections 203,204 interposed between the upper and lower plate sections 201,202, and four rearwardly opening slots 21 at intersections of the upper, lower and left and right engaging plate sections 201,202,203,204. Each of the holding frames 2 is further provided with an aligned pair of racks 25 at two lateral side portions thereof such that the racks 25 extend between the front and rear ends of the frame body 22 so as to form a plurality of holding chambers 24. Recording media, such as floppy disks or recording tapes, can be disposed in the holding chambers 24. The dimensions of the holding chambers 24 should not be restricted to a particular size, and may differ in size so as to accommodate different sizes of recording media. In the first preferred embodiment, two of the holding frames 2 are inserted into the outer casing 1 via the front open end 10 such that the upper and lower flange portions 110,111 and the left and right flange portions 112,113 of the engagement flange 11 in the outer casing 1 are press-fitted into the flange engaging grooves 200 of the holding frames 2 via the rearwardly opening slots 21. When thus provided, the holding frames 2 are confined with the outer casing 1. The holding frames 2 are further interconnected fixedly by the fastening devices for preventing movement of the holding frames 2 within the outer casing 1 in upward, downward, and left and right directions.

Each of the fastening devices can be a U-shaped clip 3 within which the left engaging plate section 203 of one of an adjacent pair of the holding frames 2 and the right engaging plate section 204 of the other one of the adjacent pair of the holding frames 2 are clamped.

Figure 3:
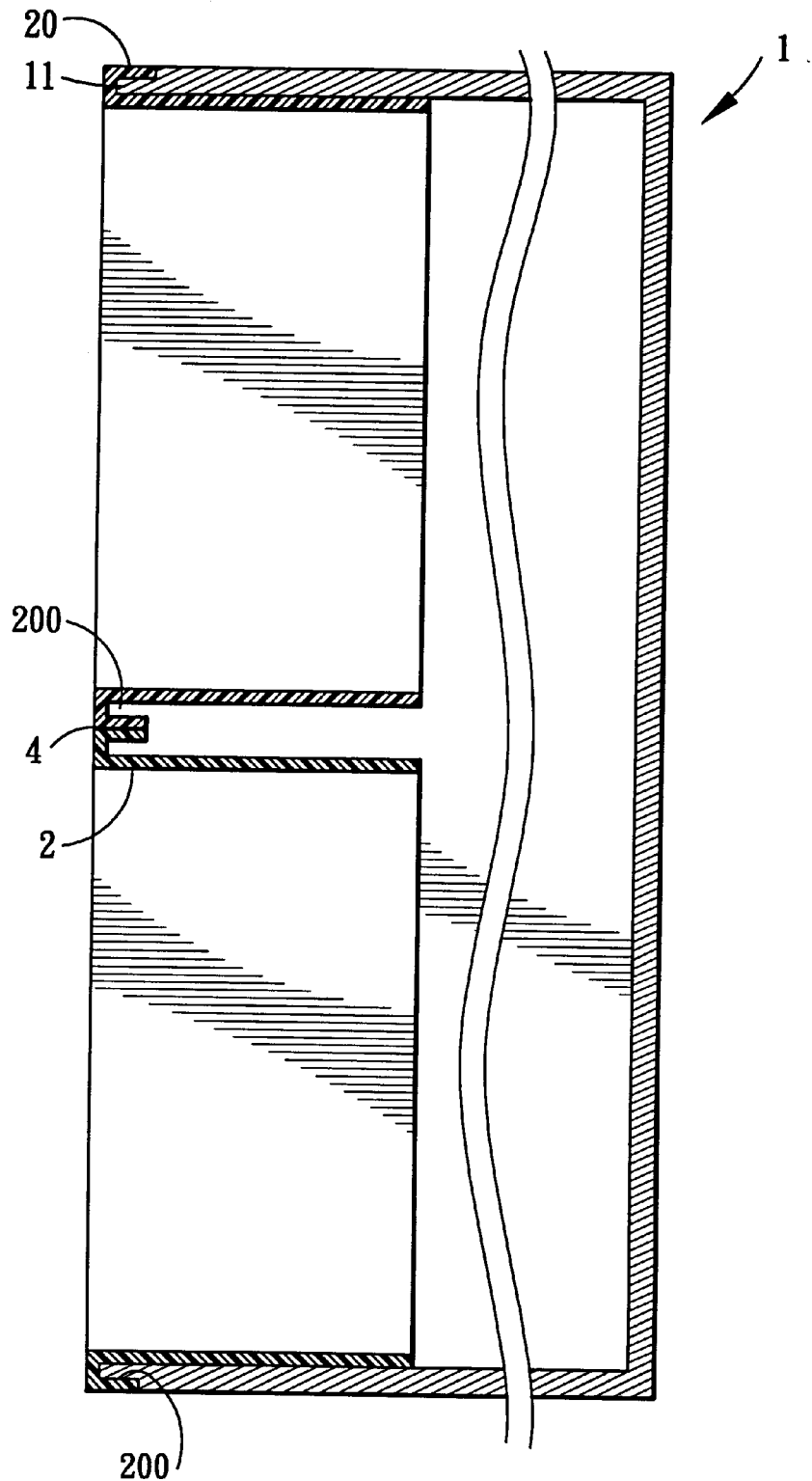
FIG. 3 is a sectional view of a second preferred embodiment of the present invention.

Referring to FIG. 3, a second preferred embodiment of the present invention is shown to be similar to the first preferred embodiment in construction, except that the fastening device employed herein is an adhesive 4 applied between an adjacent pair of the holding frames 2 for interconnecting the adjacent pair of the holding frames 2.

Figure 4:
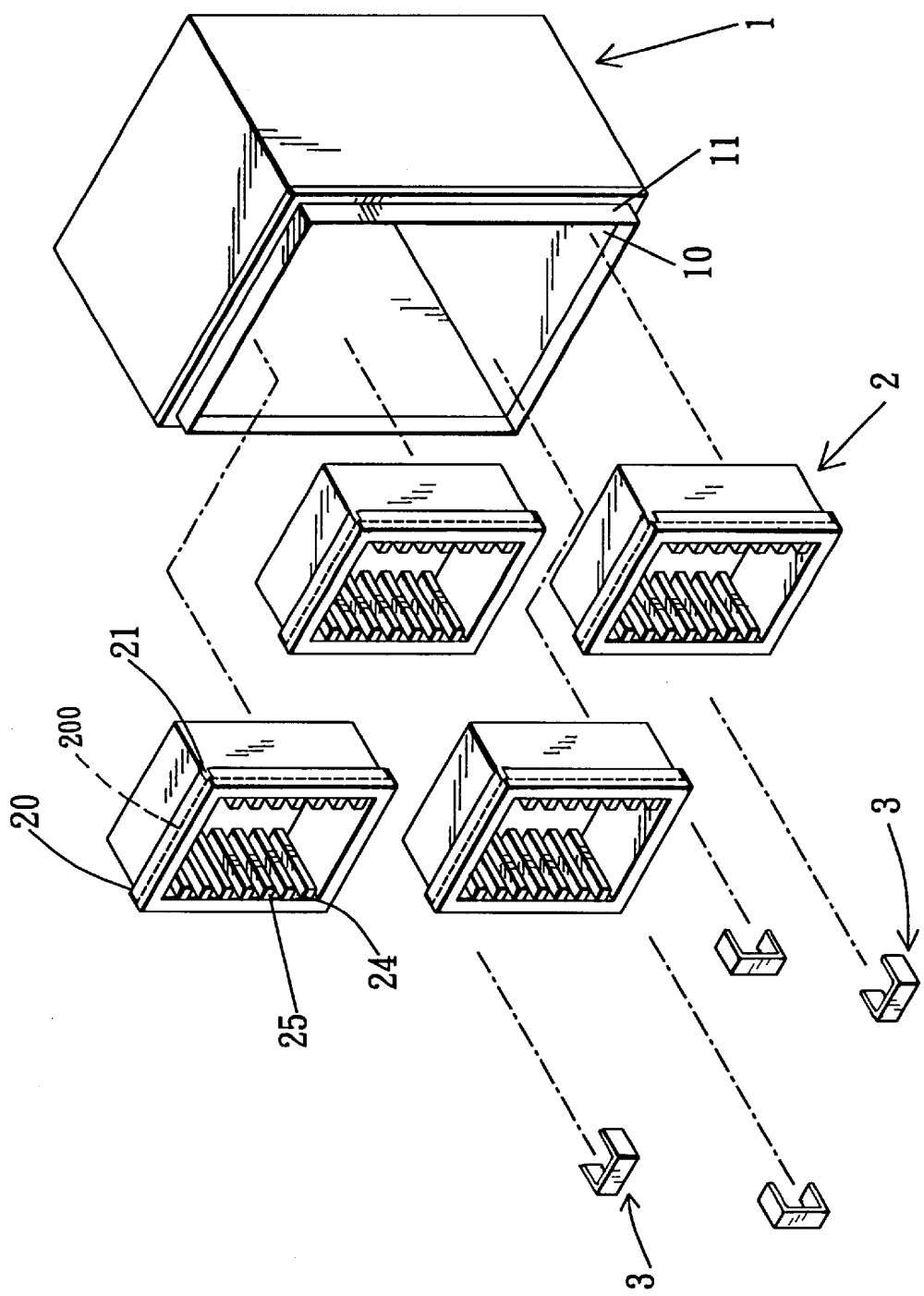
FIG. 4 is an exploded perspective view of a third preferred embodiment of the present invention.
Figure 5:
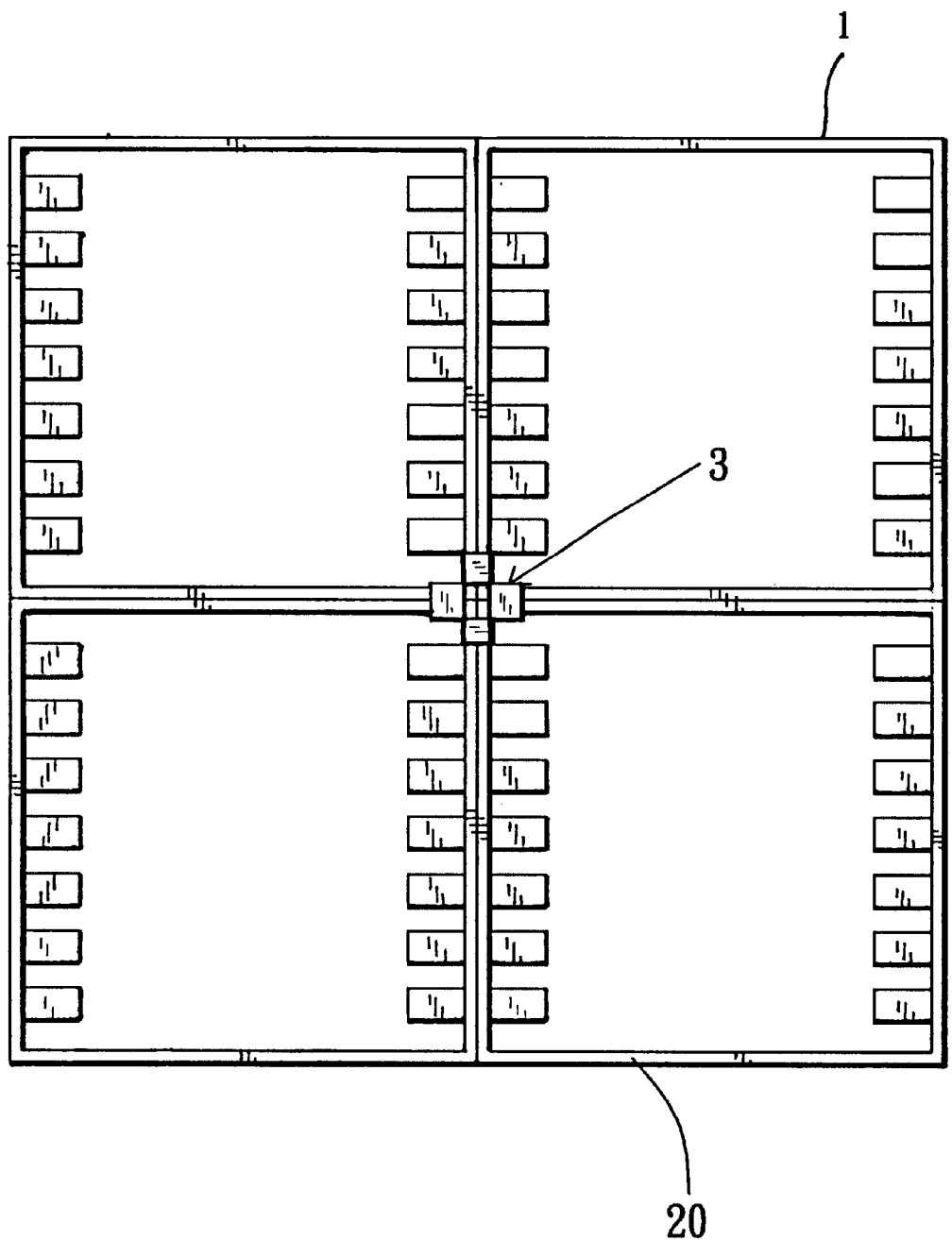
FIG. 5 is a front view of the third preferred embodiment, illustrating how the holding frames employed therein are fastened in order to prevent relative movement thereamong.

Referring to FIGS. 4 and 5, a third preferred embodiment of the present invention is shown to be similar to the first preferred embodiment in construction, except that the outer casing 1 is sufficiently large to permit insertion of four of the holding frames 2 into the outer casing 1. The engagement flange 11 of the outer casing 1 are press-fitted into the engaging grooves 200 of the holding frames 2 in the aforesaid manner. Left and right plate sections of the adjacent pairs of the holding frames 2 are clamped together by the use of four U-shaped clips 3, as shown in FIG. 5.

Figure 6:
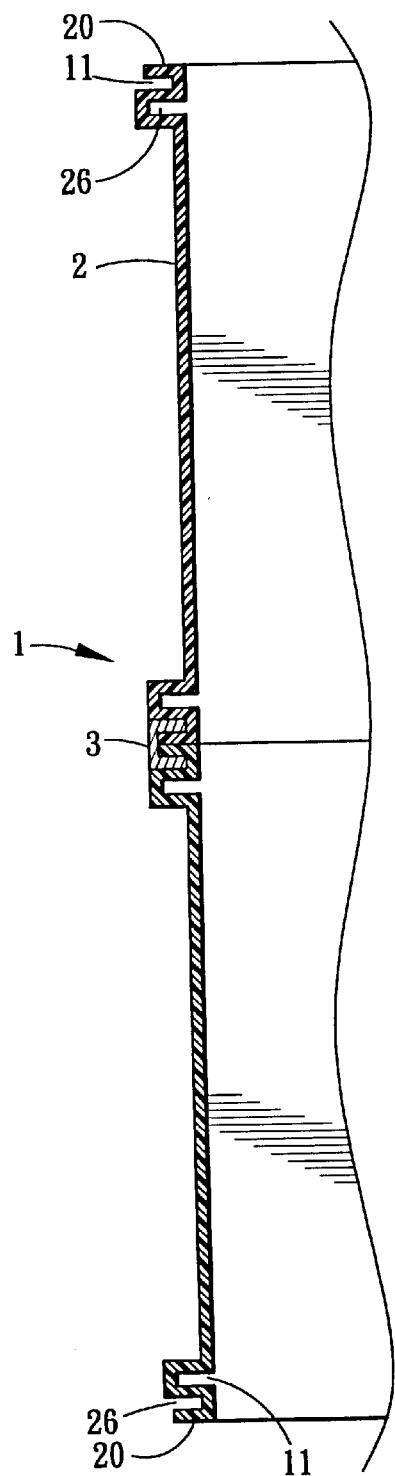
FIG. 6 is a sectional view of a fourth preferred embodiment of the present invention, illustrating how the holding frames employed therein are fastened in order to prevent relative movement of the same.

Referring to FIG. 6, a fourth preferred embodiment of the present invention is shown to be similar to the previous embodiment in construction, except that the flange engaging member 20 of each of the holding frames 2 further defines a rectangular frontwardly opening groove 26 such that, when a U-shaped clip 3 is inserted into the grooves 26 of the pair of the adjacent holding frames 2, the left and right plate sections of the holding frames 2 can be further fastened so to prevent relative movement therebetween.

Note that the holding frames 2 can be molded by using a single mold unit so that the manufacture cost of the present invention can be reduced.

Since the consumer can selectively purchase an outer casing of a desired size in order to confine all of the holding frames 2 therein, the storage assembly of the present invention can enhance tidiness of the immediate surrounding.

With this invention thus explained, it is apparent that numerous modifications and variations can be made without departing from the scope and spirit of this invention. It is therefore intended that this invention be limited only as indicated by the appended claims.

I claim:

1. A storage assembly for recording media, comprising:

a rectangular outer casing having an open front end, a closed rear end, and a rectangular engagement flange extending frontwardly from said front end, said engagement flange having an upper flange portion, a lower flange portion, and a pair of left and right flange portions interposed between said upper and lower flange portions;

a plurality of fastening devices; and at least two holding frames inserted within said outer casing, each of said holding frames having a rectangular frame body with front and rear ends and of a dimension smaller than that of said outer casing, and a flange engaging member fixed on said frame body at said front end and extending toward said rear end thereof to define a flange engaging groove between said frame body and said flange engaging member, said flange engaging member of each of said holding frames being rectangular and having an upper engaging plate section, a lower engaging plate section, and left and right engaging plate sections interposed between said upper and lower plate sections, and four rearwardly opening slots at intersections of said upper, lower and left and right engaging plate sections, said holding frames being inserted into said outer casing via said front open end such that said upper and lower flange portions and said left and right flange portions of said engagement flange in said outer casing are press-fitted into said flange engaging grooves of said holding frames via said rearwardly opening slots, each adjacent pair of said holding frames being interconnected fixedly by one of said fastening devices for preventing movement of said holding frames within said outer casing in upward, downward, and left and right directions.

2. The storage assembly as defined in claim 1, wherein each of said fastening devices includes a U-shaped clip within which said left engaging plate section of one of an adjacent pair of said holding frames and said right engaging plate section of the other one of said adjacent pair of said holding frames are clamped.

3. The storage assembly as defined in claim 1, wherein each of said fastening devices includes an adhesive that is applied between an adjacent pair of said holding frames for interconnecting said adjacent pair of said holding frames.

* * * * *